(12) United States Patent
Safarian et al.

(10) Patent No.: US 8,112,056 B2
(45) Date of Patent: Feb. 7, 2012

(54) DISTRIBUTED DIRECT CONVERSION RECEIVER (DDCR) FOR UWB SYSTEMS

(75) Inventors: Aminghasem Safarian, Tustin, CA (US); Lei Zhou, Irvine, CA (US); Payam Heydari, Irvine, CA (US)

(73) Assignee: The Regents of The University of California, Oakland, CA (US)

( * ) Notice: Subject to any disclaimer, the term of this patent is extended or adjusted under 35 U.S.C. 154(b) by 762 days.

(21) Appl. No.: 12/180,251

(22) Filed: Jul. 25, 2008

(65) Prior Publication Data

US 2009/0088115 A1    Apr. 2, 2009

Related U.S. Application Data

(60) Provisional application No. 60/951,817, filed on Jul. 25, 2007.

(51) Int. Cl.
 *H04B 1/10* (2006.01)
 *H04B 1/26* (2006.01)
(52) U.S. Cl. .......................... 455/296; 455/323; 455/325
(58) Field of Classification Search .................. 455/323, 455/296, 295, 325, 304, 327, 333; 333/103, 333/104; 375/130
See application file for complete search history.

(56) References Cited

U.S. PATENT DOCUMENTS

| 7,177,341 | B2* | 2/2007 | McCorkle | 375/130 |
| 7,409,198 | B2* | 8/2008 | McCorkle et al. | 455/230 |
| 7,508,860 | B2* | 3/2009 | Hyun et al. | 375/130 |
| 7,679,436 | B2* | 3/2010 | Jimenez et al. | 330/51 |
| 7,772,913 | B2* | 8/2010 | Ikeda | 327/355 |
| 7,792,513 | B2* | 9/2010 | Safarian et al. | 455/296 |
| 7,804,347 | B2* | 9/2010 | Ikeda | 327/291 |
| 2007/0116105 | A1* | 5/2007 | Tero et al. | 375/219 |
| 2008/0069183 | A1* | 3/2008 | Terada | 375/137 |

OTHER PUBLICATIONS

Kim et al., "*An Ultra-Wideband CMOS Low Noise Amplifier for 3—5-GHz UWB System*" IEEE Journal of Solid-State Circuits, vol. 40, Issue 2, Feb. 2005, pp. 544 -547.
Jongsoo et al., "*A 3-10 GHz SiGe resistive feedback low noise amplifier for UWB applications*", Radio Frequency integrated Circuits (RFIC) Symposium, Jun. 12-14, 2005, pp. 545 -548.
Razavi et al., "*A. 0.13/spl mu/m CMOS UWB transceiver*", IEEE Solid-State Circuits Conference, 2005. Feb. 6-10, 2005 pp. 216-218.
lida et al., "*A 3.1 to SGHz CMOS DSSS UWB transceiver for WPANs*", IEEE Solid-State Circuits Conference, Feb. 6-10, 2005, pp. 214-216.
Ismail et al., "*A 3-10-GHz low-noise amplifier with wideband LC-ladder matching network*", IEEE Journal of Solid-State Circuits, vol. 39, Issue 12, Dec. 2004, pp. 2269-2277.
Bevilacqua et al., "*An ultrawideband CMOS low-noise amplifier for 3.1-10.6-GHz wireless receivers*"; IEEE Journal of Solid-State Circuits, vol. 39, Issue 12, Dec. 2004, pp. 2259-2268.
Ismail et al., "*A 3.1 to 8.2GHz direct conversion receiver for MB-OFDM UWB communications*", IEEE Solid-State Circuits Conference, Feb. 6-10, 2005, pp. 208-210, pp. 208-210.
Zhang et al., "*Low power programmable-gain CMOS distributed LNA for ultra-wideband applications*", Symposium on VLSI Circuits, Jun. 16-18, 2005 pp. 78-81.

\* cited by examiner

*Primary Examiner* — Sonny Trinh
(74) *Attorney, Agent, or Firm* — Orrick, Herrington & Sutcliffe, LLP

(57) ABSTRACT

A novel DDCR RF front-end for use in UWB applications combining a distributed approach which provides wideband functionality of the RF front-end with I-Q requirement of DCRs. The distributed architecture uses composite cells of a merged LNA and mixer along the input RF T-line.

20 Claims, 2 Drawing Sheets

DISTRIBUTED DIRECT CONVERSION RECEIVER (DDCR) FOR UWB SYSTEMS

CROSS-REFERENCE TO RELATED APPLICATIONS

This application claims the benefit of U.S. Provisional Patent Application Ser. No. 60/951,817, filed Jul. 25, 2007, which is hereby incorporated by reference in its entirety.

This invention was made with Government support under Grant No. 0449433, awarded by the National Science Foundation Chemistry. The Government has certain rights in this invention.

FIELD

The subject matter described herein is directed to a distributed direct conversion receiver (DDCR) RF front-end for ultra-wideband (UWB) systems that can handle high-speed data rates for short to medium range wireless application, and, more particularly, to low-noise silicon-based monolithic direct conversion radio for UWB transceivers.

BACKGROUND

UWB wireless broadcasts are capable of carrying huge amounts of data up to 250 feet with extremely little transmit power and high immunity to interference and multipath fading. Indeed, the spread spectrum characteristics of UWB wireless systems, and the ability of the UWB wireless receivers to highly resolve the signal in multi-path fading channels due to the nature of the short duration transmitting impulse signals make the UWB systems a desirable wireless system of choice in a wide variety of high-rate, short- to medium-range communications. The ability to also locate objects to within one inch attracts the military, law-enforcement, and rescue agencies. Other applications include the broadband sensing using active sensor networks and collision-avoidance.

The circuit techniques that are used to realize different circuit components in a UWB transceiver are quite different from those proposed in current narrow bandwidth RF technology. Therefore, novel circuit topologies that achieve a gain-for-delay-tradeoff without affecting bandwidth, thus operating at substantially higher frequencies than conventional circuits, are desirable.

Generally, a few different methods have been used to achieve wideband characteristics of the RF front-end circuits, particularly with a low noise amplifier (LNA), which comes after the antenna and should be matched generally to 50 ohms ($\Omega$), the impedance seen by the antenna. The first solution has been to use resistive feedback amplifiers (Kim et al., "*An Ultra-Wideband CMOS Low Noise Amplifier for 3-5-GHz UWB System*" IEEE Journal of Solid-State Circuits, Volume 40, Issue 2, February 2005 Page(s): 544-547). The disadvantage this type of wideband amplifier suffers is that at higher frequencies the input matching and gain drops due to parasitic capacitance. This type of wideband amplifier partially covers the UWB operational frequency band, more particularly, the lower band of UWB (e.g., 3-5 GHz). However, a bipolarversion of a resistive amplifier has been described that covers all of the UWB (Jongsoo et al., "*A 3-10 GHz SiGe resistive feedback low noise amplifier for UWB applications*", Radio Frequency integrated Circuits (RFIC) Symposium, 12-14 Jun. 2005 Page(s): 545-548). DCR architectures for UWB have also been described to cover the lower frequency band UWB system (e.g., 3-5 GHz) (Razavi et al., "*A. 0.13/spl mu/m CMOS UWB transceiver*", IEEE Solid-State Circuits Conference, 2005. 6-10 Feb. 2005 Page(s): 216-218; Iida et al., "*A 3.1 to 5GHz CMOS DSSS UWB transceiver for WPANs*", IEEE Solid-State Circuits Conference, 2005. 6-10 Feb., Page(s): 214-216).

The second solution has been to extend the narrow band technique to wide band using high order band-pass filtering to achieve the required wideband input matching (Ismail et al., "*A 3-10-GHz low-noise amplifier with wideband LC-ladder matching network*", IEEE Journal of Solid-State Circuits, Volume 39, Issue 12, December 2004 Page(s): 2269-2277; Bevilacqua et al., "*An ultrawideband CMOS low-noise amplifier for 3.1-10.6-GHz wireless receivers*"; IEEE Journal of Solid-State Circuits, Volume 39, Issue 12, December 2004 Page(s): 2259-2268; Ismail et al., "*A 3.1 to 8.2 GHz direct conversion receiver for MB-OFDM UWB communications*", IEEE Solid-State Circuits Conference, 2005. 6-10 Feb., Page(s): 208-210). However, this method suffers from sensitivity of the bandwidth to passive element variations due to processing. Moreover, the overall response of the wideband LNA is flat in the mid band, but generally rolls off at higher frequency due to the deviation from the 50 $\Omega$ reference impedance seen at the gate of the LNA input transistor. Also, the solutions described in the Ismail articles from 2004 and 2005 are designed using bipolar transistors.

The third solution has been to deploy a distributed architecture to achieve wideband characteristics on the front-end (Zhang et al., "*Low power programmable-gain CMOS distributed LNA for ultra-wideband applications*", Symposium on VLSI Circuits, 2005. 16-18 Jun. 2005 Page(s): 78-81). The main advantage of a distributed architecture is its intrinsic wideband characteristics and, consequently, less sensitivity to component variations due to processing. In Zhang et al., a linear gain stage has been introduced as an LNA distributed along an artificial gate and drain transmission lines (T-lines), and it involves only linear operation of the distributed architecture.

SUMMARY

Embodiments disclosed herein are directed to novel DDCR RF front-ends for use in UWB applications. As discussed below, the embodiments combine the idea of a distributed approach, which provides the wideband functionality of an RF front-end, with the IQ functionality of DCRs. The unique distributed architecture uses composite cells of a merged LNA and mixer along the input RF T-line.

Other systems, methods, features and advantages of the inventions will be or will become apparent to one with skill in the art upon examination of the following figures and detailed description.

BRIEF DESCRIPTION DRAWINGS

The details of the inventions, including fabrication, structure and operation, may be gleaned in part by study of the accompanying figures, in which like reference numerals refer to like parts. The components in the figures are not necessarily to scale, emphasis instead being placed upon illustrating the principles of the inventions. Moreover, all illustrations are intended to convey concepts, where relative sizes, shapes and other detailed attributes may be illustrated schematically rather than literally or precisely.

DESCRIPTION

Figure 1:
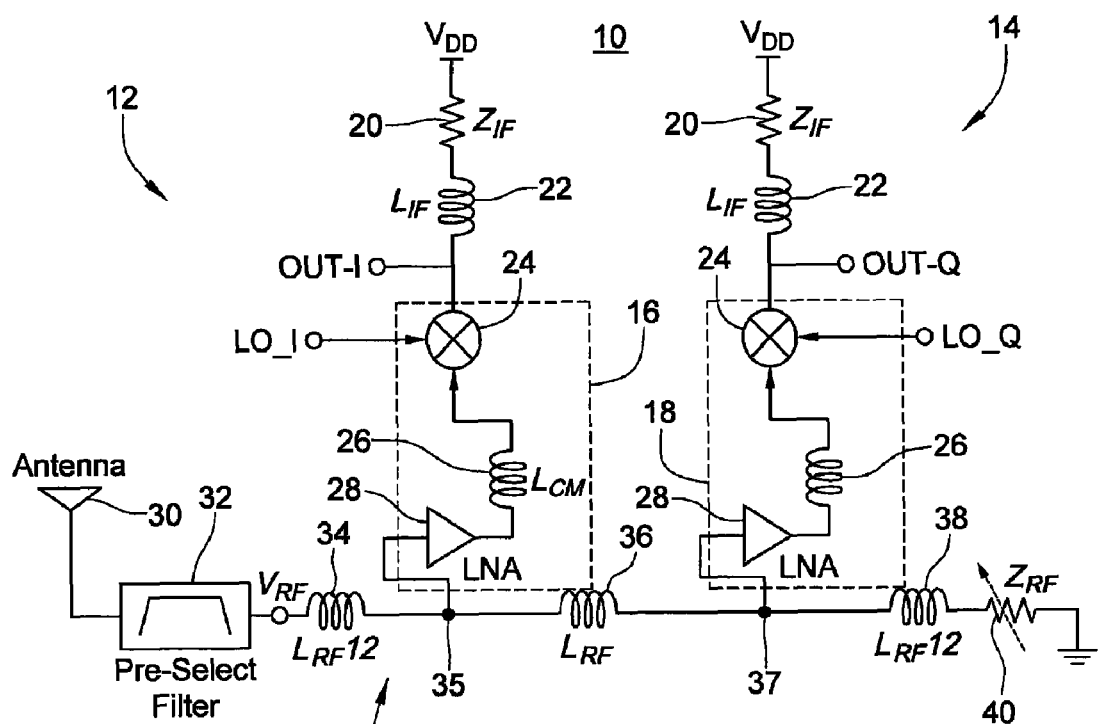
FIG. 1 is a schematic of an example embodiment of a DDCR for a UWB RF front-end.

Each of the additional features and teachings disclosed below can be utilized separately or in conjunction with other features and teachings to produce a DDCR RF front-end for UWB applications. Representative examples of the present inventions, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the inventions. Therefore, combinations of features and steps disclosed in the following detail description may not be necessary to practice the inventions in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Embodiments discussed herein are directed to a DDCR RF front-end for UWB applications. The low power DDCR RF front-end incorporates composite cells, merging a low-noise amplifier (LNA) and a mixer along the artificial transmission line (T-line) to achieve wideband matching, gain, noise, and linearity requirements for an UWB system.

Generally, in a distributed architecture, the gain stages are distributed along artificial or actual T-lines. Here, the two gain stages are also used for IQ data. Moreover, instead of using two different distributed receiver paths for each in-phase (I) and quadrature-phase (Q) data similar to conventional DCRs used to achieve wide-band characteristics, an area and power efficient architecture based on distributed concept for wideband characteristics of RF front-end is provided. The circuit utilizes two paths of through composite cells of identical merged LNA and current commuting mixers, one path for in-phase and the other path for quadrature-phase signal.

Distributed circuits incorporating transmission lines trade propagation delay for signal bandwidth. In broadband systems the delay is more tolerable than in limited bandwidth systems because it can be calibrated using delay prediction circuits, which justifies the use of distributed circuits in these applications. In the frequency domain, one source of bandwidth limitation in conventional analog circuits is the drop in input impedance of the circuits as frequency increases. In a distributed circuit, the transistor's capacitances are absorbed into the T-line. Hence, until the cutoff frequency of the T-line itself is approached, the input impedance (and the bandwidth to a certain degree) remains constant.

Turning in detail to the figures, an example embodiment of a DDCR RF front end circuit 10 is shown in FIG. 1 in which composite cells 16 and 18 perform both low-noise amplification and RF mixing. The circuit 10 includes two stages 12 and 14 distributed along the input artificial RF T-line 11, which are preferably monolithic (i.e., fabricated on the same semiconductor substrate). Each stage 12 and 14 includes a composite cell 16 and 18 comprising a current-commuting mixer 24 and a low-noise amplifier (LNA) 28, shown as a merged low-noise transconductance amplifier (LNTA) $M_1$ 29 in FIG. 2, which is a schematic of another example embodiment of the DDCR RF front end circuit 10 shown in FIG. 1. To mitigate the problems of large area and high power consumption in conventional distributed circuits, the DDCR RF front end circuit 10 preferably incorporates a minimum number of stages. Here, only two stages 12 and 14 are realized using three inductors 34, 36, 38. One stage 12 is used for the I component and the other stage 14 is used for the Q component of the UWB signal, resulting in the optimum use of the signal appearing at each tap node 35 and 37 of the RF T-line 11. It should be noted that any of the circuit nodes can also be referred to as ports, although ports can also include multiple nodes. However, it should be noted that more than two stages can be employed in other architectures.

The RF T-line 11 absorbs the input parasitic capacitances of the constituent LNAs 28, which results in wideband impedance match at the input of the front-end with the antenna 32 and pre-select filter 30. While the input capacitance is absorbed to the RF T-line 11, the middle point capacitance will be absorbed to an intermediate shunt peaking inductor of $L_{CM}$ 26. The output capacitance will be part of a low frequency load (500 MHz bandwidth). While the DDCR 10 benefits from the wideband characteristics of the distributed T-line 11 at the RF port matched to the antenna 32 and pre-select filter 30, it advantageously incorporates two paths for IQ data reception as noted above. Hence, the DDCR circuit 10 meets the wideband flat requirements of gain, NF, and linearity for UWB systems.

The composite cells 16 and 18 of the DDCR UWB RF front-end circuit 10 allow for the re-use, or shared use, of the bias current for both the LNA 28 and the mixer 24. This, among other things, reduces the power consumption of the RF front-end.

Preferably, the output capacitances of the composite cells 16 and 18 partially set the −3 db bandwidth to a few hundreds of mega-hertz (e.g. 250-400 MHz) at the baseband output. Therefore, because output voltages $Q_{BB}$ and $I_{BB}$ are zero-IF (e.g., baseband) I/Q signals, the output T-line conventionally used in distributed topologies for bandwidth enhancement is no longer needed. This contributes to a significant reduction of the chip area. This and the other embodiments of the DDCR RF can achieve wideband flat specs, i.e., gain, matching, NF, and linearity, in both I and Q paths. It should be noted that this and other embodiments of the DDCR RF circuit 10 can be configured to receive a differential local oscillator input signal or a single-ended local oscillator input signal. Likewise, the output ports that produce output voltages $Q_{BB}$ and $I_{BB}$ can be either differential or single-ended.

Additionally, the DDCR RF circuit 10 can be configured to provide variable-gain to accommodate large in-band interferes, such as WLAN blockers. By controlling the common mode voltage of $LO_{I,Q}$ signals, the $g_m$ of the LNA 28 and hence the front-end's gain changes accordingly.

Figure 2:
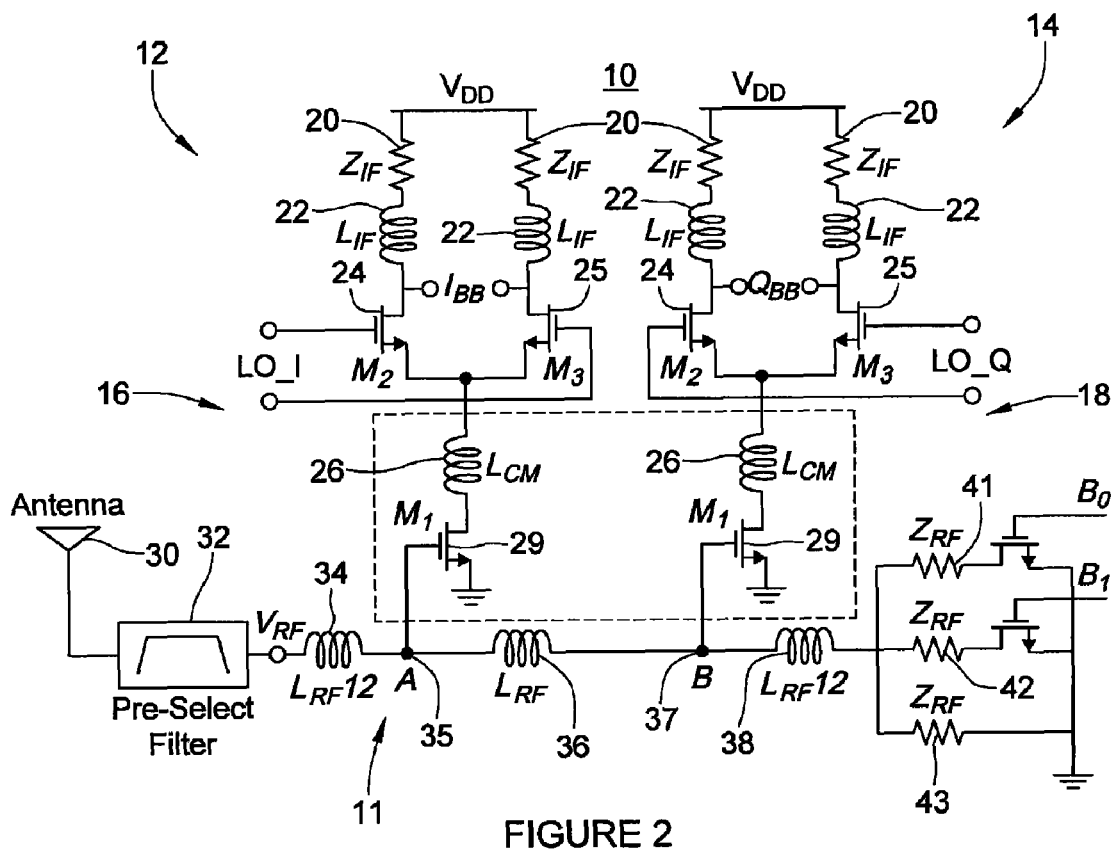
FIG. 2 is a schematic of an example embodiment of a DDCR architecture for UWB systems.

The DDCR RF circuit 10 also employs variable input matching through variable RF termination resistance $Z_{RF}$ 40 in order to improve the noise-power-match performance. As shown in FIG. 2, the variable RF termination resistance $Z_{RF}$ 40 is implemented using a bank of parallel resistances $Z_{RF}$ 41, 42 and 43 that is controlled by two bits, $B_0$ and $B_1$. The improvement mechanism is explained in the following: The voltage-gain of the DDC-RF is "$(1+\Gamma_S) \times A_V$", where $A_V$ is the front-end's voltage-gain and $\Gamma_S$ is the receiver's input reflection coefficient: $\Gamma_S$ is between 0 (power-matched RX with a gain of $A_V$) and 1 (power un-matched RX with a gain of $2 A_V$, and with zero-transferred power from antenna). The 6 dB gain boosting is due to input mismatch. Consequently, the noise contribution from the circuit remains unchanged and the NF improves by 6 dB. This means that few decibels of mismatch at the RF input port of the front-end improves the receiver's voltage gain and NF. Such a variable RF termination is implemented using three generally equal parallel resistances $Z_{RF}$ and two NMOS switches controlled by two bits, $B_0$ and $B_1$, realizing RF terminations of $Z_{RF}$, $Z_{RF}/2$ and $Z_{RF}/3$ ($Z_{RF}=150\Omega$).

The output terminal of each mixer is connected to the shunt peaking load Inductor $L_{IF}$ 22 and resistance $Z_{IF}$ 20 to achieve 500 MHz filtering. Each cell 16 and 18 constitutes a fully differential single-balanced circuit, thereby showing a robust performance in the presence of the common-mode noise. In each cell, the low frequency data component is formed by multiplying the input RF voltage by a periodic waveform running at the LO frequency, driving switching pair transistors, $M_2$ 24 and $M_3$ 25.

Figure 3:
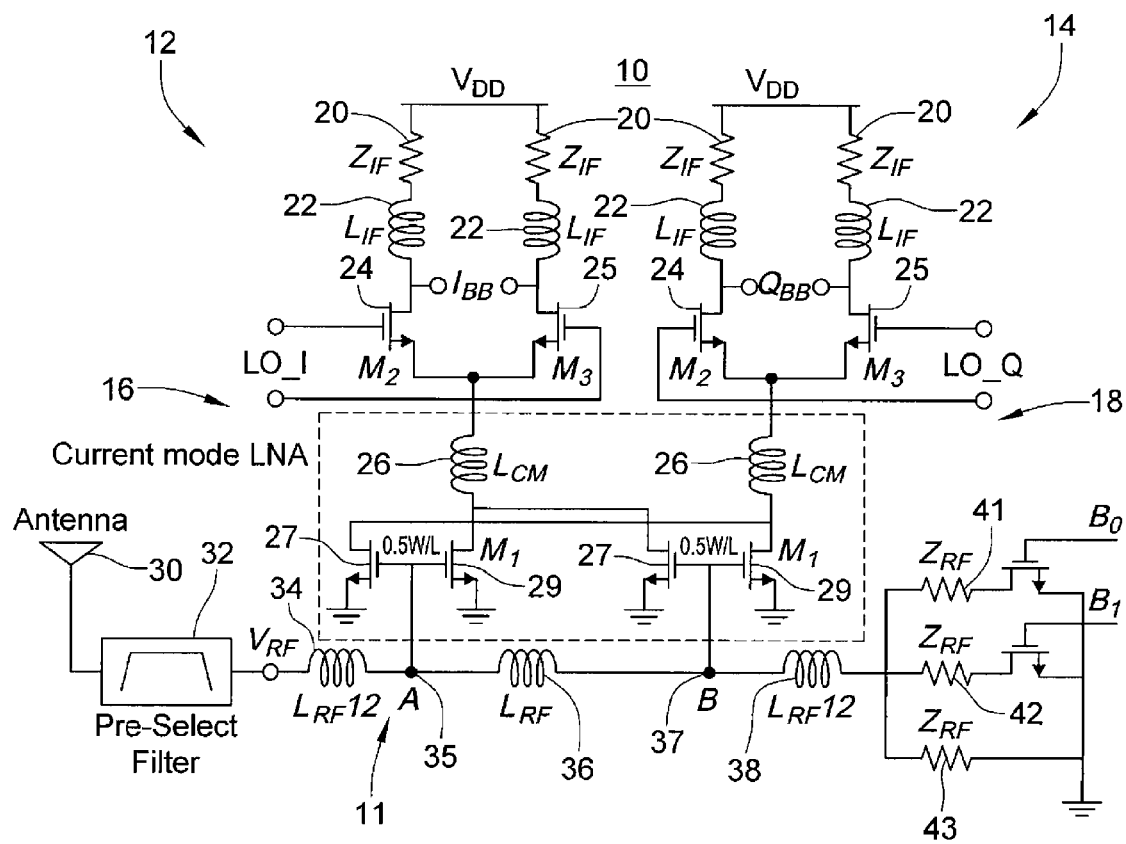
FIG. 3 is a schematic of an example embodiment of a symmetric DDCR architecture for UWB systems.

The RF signal received at the antenna propagates through RF input T-line 11. The signal at point A 35 in FIG. 2 feeds the I-LNA/Mixer 16 and RF signal at point B 37 feeds the Q-LNA/Mixer 18. Because of the inherent delay of the T-line the RF signals at point A and B have a phase difference. Also due to the loss of the inductors of the T-line, RF signals at point A and B have different amplitudes. A phase and amplitude mismatch will occur between the RF signals at points A and B in FIG. 2, which results in IQ phase and gain mismatches. To alleviate this issue, another example embodiment of a symmetric DDCR is provided in FIG. 3, in which the two tail current transistors $M_1$ with aspect ratios of W/L (cf. FIG. 2) are replaced with four transistors 27 and 29 with sizes of 0.5 W/L, as shown in FIG. 3. Hence, both I and Q LNA/mixer paths sample the RF signal at node A and B, while receiving the same RF signal. Therefore, there will be no phase and gain mismatches for IQ paths.

Thus, instead of using two different distributed receiver paths for each in-phase (I) and quadrature-phase (Q) data similar to conventional DCRs to achieve wide-band characteristics of RF front-end, an area and power efficient architecture, based on a distributed concept for wideband characteristics of RF front-end is implemented. Therefore, the preferred embodiment of the DDCR has the following features:

1. Wideband matching at input RF port to the antenna and pre-select filter (e.g., matched to 50Ω).

2. Wideband flat gain, noise figure (NF), and linearity of the DDCR for the I and Q paths.

3. Re-use of the bias current for both the LNA and mixer cells, hence reducing the power consumption of the RF front-end.

4. Variable matching resistance to achieve better noise and power-matching performance.

Table I shows some of the simulation results relating to the embodiments described herein. This table shows the $s_{11}$, NF and gain of the receiver for three different values of matching networks at the lower and higher end frequencies of the UWB systems, 3 GHz and 10 GHz, respectively.

TABLE I

Simulation Results of the distributed receiver RF front-end

| $R_{match}$ (Ω) | 150 | | 75 | | 50 | |
| --- | --- | --- | --- | --- | --- | --- |
| | (3 GHZ, 10 GHz) | | (3 GHZ, 10 GHz) | | (3 GHz, 10 GHz) | |
| $S_{11}$ (dB) | −9 | −7.3 | −14 | −10 | −20 | −13 |
| NF (dB) | 5.6 | 10.9 | 6.9 | 11.4 | 7.8 | 12 |
| Gain (dB) | 15.1 | 13 | 13.4 | 11 | 12 | 10 |

In the foregoing specification, the inventions have been described with reference to specific embodiments thereof. It will, however, be evident that various modifications and changes may be made thereto without departing from the broader spirit and scope of the inventions. For example, the reader is to understand that the specific ordering and combination of process actions shown in the process flow diagrams described herein is merely illustrative, unless otherwise stated, and the inventions can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the inventions are not to be restricted except in light of the attached claims and their equivalents.

What is claimed:

1. A circuit comprising
   an RF input transmission line,
   a first stage for in-phase (I) data, and
   a second stage for quadrature (Q) data, wherein the first and second stage include merged low noise amplifiers and mixers positioned along the RF Transmission input transmission line.

2. The circuit of claim 1 further comprising a variable RF termination resistance along the transmission line.

3. The circuit of claim 2 wherein the termination resistance includes a bank of parallel resistances.

4. The circuit of claim 1, wherein the RF input T-line is configured to absorb the input parasitic capacitance of the first and second stages.

5. The circuit of claim 1, wherein the first and second stages each comprise an output port and the output ports of the first and second stages are not coupled to a transmission line.

6. The circuit of claim 5, wherein the outputs of the first and second stages are not coupled to an artificial transmission line.

7. The circuit of claim 5, wherein the first and second stages each comprise a mixer input port, the circuit being configured such that control of the common mode voltage applied to the mixer input ports varies the gain at the respective output ports.

8. The circuit of claim 5, wherein the circuit is configured as a direct conversion distributed receiver comprising only two stages configured to amplify an mix an input signal to an intermediate frequency.

9. The circuit of claim 1, wherein the RF input transmission line, first stage and second stage are monolithic.

10. A method of receiving in an ultra-wideband (UWB) system receiver, comprising:
   propagating a received RF signal along an RF input transmission line,
   inputting the propagated RF signal into a first stage and a second stage, each coupled with the input RF transmission line, the first and second stages configured to amplify and directly convert the received RF signal to a zero-IF frequency in-phase signal and a zero-IF frequency quadrature phase signal, respectively, and outputting the zero-IF in-phase signal from the first stage and the zero-IF quadrature signal from the second stage.

11. The method of claim 10, wherein the input RF transmission line, first stage and second stage are monolithic.

12. The method of claim 10, wherein the first stage comprises a first low noise amplifier coupled in series with a first mixer and wherein the second stage comprises a second low noise amplifier coupled in series with a second mixer.

13. The method of claim 12, comprising:

sharing a first bias current between the first low noise amplifier and the first mixer; and sharing a second bias current between the second low noise amplifier and the second mixer.

14. The method of claim 13, wherein a first local oscillator (LO) signal is input to the first mixer and second local oscillator (LO) signal is input to the second mixer, the method further comprising controlling the common mode voltage of the first and second LO signals to vary the gain of the receiver.

15. The method of claim 13, further comprising proportionally inputting a first and a second RF current component of the RF signal into the first and second stages, respectively.

16. The method of claim 13, further comprising equalizing the current of the zero-IF in-phase signal and the zero-IF quadrature (Q) signal from the second stage.

17. The method of claim 10, wherein the zero-IF in-phase signal from the first stage and the zero-IF quadrature signal from the second stage are not output onto a transmission line.

18. The method of claim 10, wherein the received RF signal is converted to the in-phase and quadrature phase signals using only the first and second stages.

19. A distributed direct conversion receiver (DDCR) system configured for ultra-wideband applications (UWB), comprising:

an antenna;

a filter coupled with the antenna;

an RF input transmission line coupled with the filter and a matching network;

a first composite stage configured for in-phase processing, the first stage comprising:

a first input port coupled with the RF input transmission line;

a first low noise amplifier coupled with the first input port; and a first mixer coupled with an output port of the first low noise amplifier, the first mixer being configured to receive a local signal at a first mixer input port and mix the local signal with an output signal from the output port of the first low noise amplifier and output a mixed, zero-IF signal at a first mixer output port; and a second composite stage configured for quadrature phase processing, the second stage comprising:

a second input port coupled with the RF input transmission line;

a second low noise amplifier coupled with the second input port; and a second mixer coupled with an output port of the second low noise amplifier, the second mixer being configured to receive a local signal at a second mixer input port and mix the local signal with an output signal from the output port of the second low noise amplifier and output a mixed, zero-IF signal at a second mixer output port.

20. The DDCR system of claim 19, wherein the first mixer input port, the second mixer input port, the first mixer output port and the second mixer output port are differential ports.

* * * * *